United States Patent
Rust et al.

(10) Patent No.: US 6,900,600 B2
(45) Date of Patent: May 31, 2005

(54) METHOD FOR STARTING A DISCHARGE LAMP USING HIGH ENERGY INITIAL PULSE

(75) Inventors: Timothy James Rust, Fremont, CA (US); James Copland Moyer, San Jose, CA (US); David Joseph Christy, San Jose, CA (US)

(73) Assignee: Monolithic Power Systems, Inc., Los Gatos, CA (US)

( * ) Notice: Subject to any disclaimer, the term of this patent is extended or adjusted under 35 U.S.C. 154(b) by 351 days.

(21) Appl. No.: 10/160,394

(22) Filed: May 31, 2002

(65) Prior Publication Data

US 2002/0171376 A1 Nov. 21, 2002

Related U.S. Application Data

(60) Continuation-in-part of application No. 09/885,244, filed on Jun. 19, 2001, now Pat. No. 6,633,138, which is a division of application No. 09/528,407, filed on Mar. 17, 2000, now Pat. No. 6,316,881, which is a division of application No. 09/209,586, filed on Dec. 11, 1998, now Pat. No. 6,114,814.

(51) Int. Cl.[7] .............................................. H05B 37/00
(52) U.S. Cl. .................... 315/291; 315/219; 315/209 R
(58) Field of Search ................................ 315/224, 291, 315/307, 225, 308, 209 R, 219, 247, 244

(56) References Cited

U.S. PATENT DOCUMENTS

| | | | | |
|---|---|---|---|---|
| 4,644,459 A | * | 2/1987 | Nilssen | 315/223 |
| 4,692,667 A | * | 9/1987 | Nilssen | 315/209 R |
| 4,723,098 A | * | 2/1988 | Grubbs | 315/306 |
| 5,365,151 A | * | 11/1994 | Spiegel et al. | 315/209 R |
| 5,612,597 A | * | 3/1997 | Wood | 315/293 |
| 6,316,881 B1 | * | 11/2001 | Shannon et al. | 315/219 |
| 6,633,138 B2 | * | 10/2003 | Shannon et al. | 315/224 |

OTHER PUBLICATIONS

Sam Ben–Yaakov et al, "The Simplest Electronic Ballast for HID Lamps," Applied Power Electronics Conference and Exposition, Eleventh Annual Conference Proceedings, Mar. 3, 1996, pp. 634–640, IEEE, New York, NY, USA.

* cited by examiner

Primary Examiner—Wilson Lee
(74) Attorney, Agent, or Firm—Perkins Coie LLP

(57) ABSTRACT

The described DC to AC inverter efficiently controls the amount of electrical power used to drive a cold cathode fluorescent lamp (CCFL). The inverter uses a full bridge that is controlled to deliver energy to the CCFL using pulse width modulation (PWM). Additionally, during striking of the CCFL, a wider initial energy pulse is used. During normal operation, a lower energy pulse is used.

6 Claims, 13 Drawing Sheets

# METHOD FOR STARTING A DISCHARGE LAMP USING HIGH ENERGY INITIAL PULSE

RELATED APPLICATIONS

This is a continuation-in-part of U.S. patent application Ser. No. 09/885,244 filed Jun. 19, 2001 now U.S. Pat. No. 6,633,138, which is a division U.S. patent application Ser. No. 09/528,407, now U.S. Pat. No. 6,316,881, which is a division of U.S. patent application Ser. No. 09/209,586, now U.S. Pat. No. 6,114,814, priority from which is claimed under 35 U.S.C. §120.

FIELD OF THE INVENTION

The present invention relates to the field of discharge lighting and, in particular, to efficiently supplying electrical power for driving a discharge lamp by initially starting the discharge lamp with a high energy initial pulse.

BACKGROUND OF THE INVENTION

A discharge lamp, such as a cold cathode fluorescent lamp (CCFL), has terminal voltage characteristics that vary depending upon the immediate history and the frequency of a stimulus (AC signal) applied to the lamp. Until the CCFL is "struck" or ignited, the lamp will not conduct a current with an applied terminal voltage that is less than the strike voltage. Once an electrical arc is struck inside the CCFL, the terminal voltage may fall to a run voltage that is approximately ⅓ of the strike voltage over a relatively wide range of input currents. When the CCFL is driven by an AC signal at a relatively high frequency, the CCFL (once struck) will not extinguish on each cycle and will exhibit a positive resistance terminal characteristic. Since the CCFL efficiency improves at relatively higher frequencies, the CCFL is usually driven by AC signals having frequencies that range from 50 KiloHertz to 100 KiloHertz.

Driving a CCFL with a relatively high frequency square-shaped AC signal will produce the maximum useful lifetime for the lamp. However, since the square shape of an AC signal may cause significant interference with other circuits in the vicinity of the circuitry driving the CCFL, the lamp is typically driven with an AC signal that has a less than optimal shape such as a sine-shaped AC signal.

Most small CCFLs are used in battery powered systems, e.g., notebook computers and personal digital assistants. The system battery supplies a direct current (DC) voltage ranging from 7 to 20 Volts with a nominal value of about 12V to an input of a DC to AC inverter. A common technique for converting a relatively low DC input voltage to a higher AC output voltage is to chop up the DC input signal with power switches, filter out the harmonic signals produced by the chopping, and output a relatively clean sine-shaped AC signal. The voltage of the AC signal is stepped up with a transformer to a relatively high voltage, e.g., from 12 to 1500 Volts. The power switches may be bipolar junction transistors (BJT) or field effect transistors (MOSFET). Also, the transistors may be discrete or integrated into the same package as the control circuitry for the DC to AC converter.

Since resistive components tend to dissipate power and reduce the overall efficiency of a circuit, a typical harmonic filter for a DC to AC converter employs inductive and capacitive components that are selected to minimize power loss, i.e., each of the selected components should have a high Q value. A second-order resonant filter formed with inductive and capacitive components is also referred to as a "tank" circuit because the tank stores energy at a particular frequency.

The electronic device incorporating the CCFL often is used in a wide variety of environmental conditions, such as wide temperature variations. Further, variations in the values of the components both within the driving circuit and in external components normally occur. Because of this, the amount of energy needed to most efficiently strike the CCFL may vary.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE INVENTION

Figure 1A:
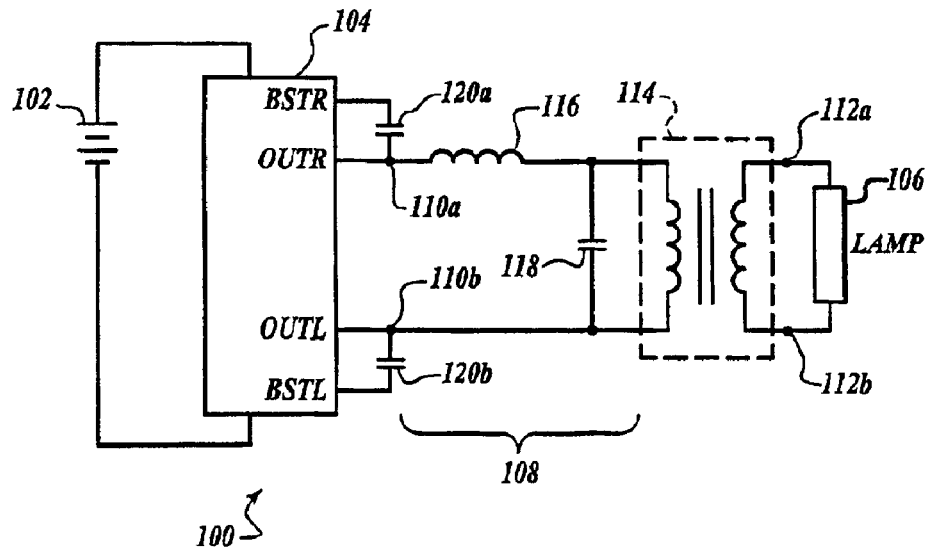
FIG. 1A is an exemplary schematic of a power controlled integrated circuit coupled to a tank circuit on a primary side of a step-up transformer for driving the discharge lamp.

As noted above, inverters for driving a CCFL typically comprise a DC to AC converter, a filter circuit, and a transformer. Examples of such circuits are shown in U.S. Pat. No. 6,114,614 to Shannon et al., assigned to the assignee of the present invention and herein incorporated by reference in its entirety. In addition, other prior art inverter circuits, such as a constant frequency half-bridge (CFHB) circuit or a inductive-mode half-bridge (IMHB) circuit, may be used to drive a CCFL. The present invention may be used in conjunction with any of these inverter circuits, as well as other inverter circuits.

The disclosure herein teaches a method and apparatus for striking and supplying electrical power to a discharge lamp, such as a cold cathode fluorescent lamp (CCFL). In accordance with the invention, the initial pulse of energy provided by the apparatus to the CCFL is larger than the steady state energy pulses provided to the CCFL after the CCFL has been struck. In one embodiment, the initial pulse is made larger by widening the time of the pulse. In another embodiment, the initial pulse may be made larger by increasing the voltage of the pulse, while maintaining the width of the pulse. The important consideration is that the initial pulse has a higher energy content. It should further be noted that the method of the present invention is described in connection with one type of inverter. However, the method may be used with other inverters.

In one embodiment, the present invention is an integrated circuit (IC) that includes four power MOSFETs arranged in an H-bridge circuit. The IC in combination with a separate output network inverts a direct current (DC) signal into an alternating current (AC) signal with enough voltage to drive a load such as a discharge lamp. The IC drives the load at the resonant frequency of the output network in combination with the load's capacitive and inductive components for a range of voltages that are provided by a DC power source.

The H-bridge circuit generates an AC signal by periodically inverting a DC signal. The control circuitry regulates the amount of electrical power delivered to the load by modulating the pulse width (PWM) of each half cycle of the AC signal. Since the PWM provides for a symmetrical AC signal during normal operation, even harmonic frequencies in the AC signal are canceled out. By eliminating the even harmonics and generally operating at the resonant frequency of the filter (load), the designed loaded Q value of the filter may be fairly low and losses in the filter may be minimized. Also, since the CCFL is connected directly across the secondary winding of the step-up transformer, except for the fraction of a second required to strike an arc inside the lamp, the step-up transformer's secondary winding generally operates at the run voltage of the CCFL. Further, it will be seen further below that the control circuitry will selectively increase the width of the pulses provided to the load during striking of the load, relative to normal operation.

Turning now to FIG. 1A, an exemplary schematic 100 displays the power control embodiment of an integrated circuit 104 (IC) coupled to a load that includes a tank circuit 108 and a lamp 106 such as a CCFL. A DC power supply 102, i.e., a battery, is connected to IC 104. A boost capacitor 120a is connected between a BSTR terminal and an output terminal 110a, which is connected to another terminal labeled as OUTR. Similarly, another boost capacitor 120b is connected between a BSTL terminal and an output terminal 110b that is connected to another terminal identified as OUTL. The boost capacitors 120a and 120b are energy reservoirs that provide a source of power to operate circuitry inside the IC 104 that can float above the operating voltage of the rest of the circuitry.

An end of inductor 116 is connected to the output terminal 110a and an opposite end of the inductor is coupled to an end of a capacitor 118 and an end of a primary winding of a step-up transformer 114. An opposite end of the capacitor 118 is coupled to another end of the primary winding of the step-up transformer 114 and the output terminal 110b. An end of a secondary winding for the step-up transformer 114 is connected to a lamp terminal 112a and another end of the secondary winding is connected to a lamp terminal 112b.

A reactive output network or the "tank" circuit 108 is formed by the components connected between the output terminals 110a and 110b and the primary winding of the step-up transformer 114. The tank circuit is a second-order resonant filter that stores electrical energy at a particular frequency and discharges this energy as necessary to smooth the sinusoidal shape of the AC signal delivered to the lamp 106. The tank circuit is also referred to as a self-oscillating circuit.

Figure 1B:
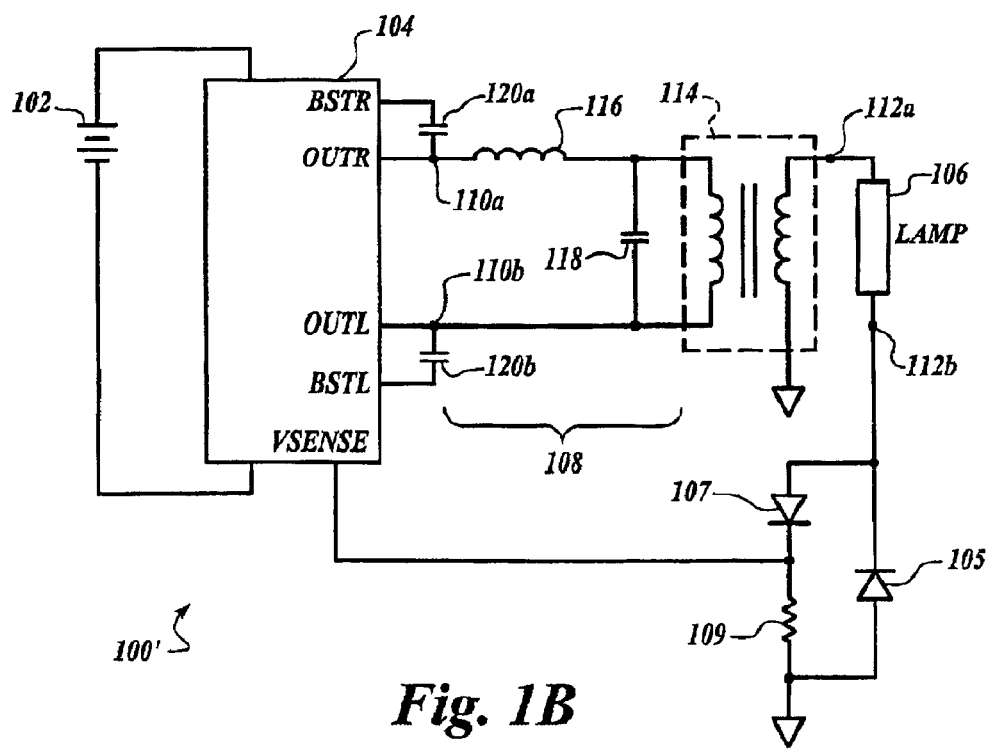
FIG. 1B is an exemplary schematic of a current controlled integrated circuit coupled to another tank circuit on a primary side of the step-up transformer for driving the discharge lamp.

In FIG. 1B, an exemplary schematic 100' displays the current control embodiment of an IC 104' coupled to a load that includes the tank circuit 108 and the lamp 106. The schematic 100' is substantially similar to that of FIG. 1A, except that additional current sensing is included. Note that the second terminal of the secondary winding is directly connected to ground. The other lamp terminal 112b is coupled to an anode of a diode 107 and a cathode of a diode 105. The cathode of the diode 107 is coupled to an end of a sense resistor 109 and a Vsense terminal at the IC 104'. The anode of the diode 105 is coupled to the other end the sense resistor 109 and ground. In this case, the IC 104' monitors the voltage across the sense resistor 109 so that the amount of current flowing into the lamp 106 may be approximated and used to control the amount of electrical power used to drive the lamp.

Figure 2A:
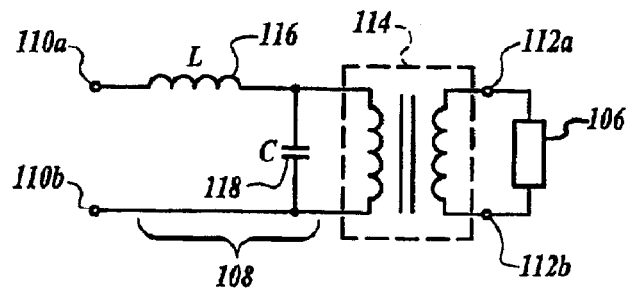
FIG. 2A is an exemplary schematic of the power controlled integrated circuit using a tank circuit disposed on the primary side of the step-up transformer to drive the discharge lamp.

Additionally, it is envisioned that the power and current control embodiments of the invention, i.e., IC 104 and IC 104', may be used with a plurality of different embodiments of the tank circuit. In FIG. 2A, the tank circuit 108 shown in FIGS. 1A and 1B is shown coupled to the IC 104. The tank circuit 108 operates as a filter which is coupled to the primary winding of the step-up transformer 114.

Figure 2B:
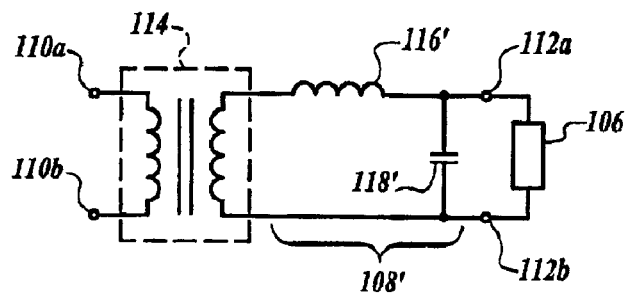
FIG. 2B is another exemplary schematic of the power controlled integrated circuit using another tank circuit disposed on the secondary side of the step-up transformer used to drive the discharge lamp.

In FIG. 2B, another embodiment of a tank circuit 108' is shown. One end of the primary winding for the step-up transformer 114 is connected to the output terminal 110a and the other end of the primary winding is connected to the other output terminal 110b. An end of an inductor 116' is coupled to one end of the secondary winding for the step-up transformer and another end of the inductor is connected to an end of capacitor 118' and the lamp terminal 112a. The other end of the secondary winding for the step-up transformer is coupled to another end of the capacitor 118' and the other lamp terminal 112b. In this embodiment, the tank circuit 108' has all of the reactive components that form the second order filter disposed on the secondary winding side of the step-up transformer 114.

Figure 2C:
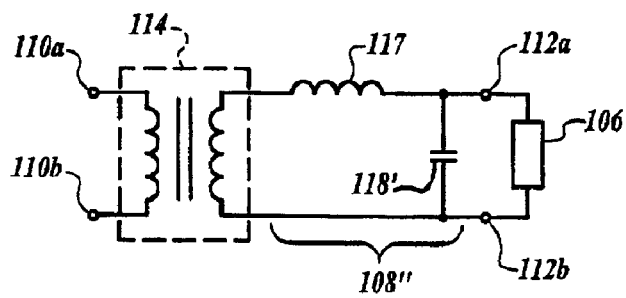
FIG. 2C is another exemplary schematic of the power controlled integrated circuit using another tank circuit disposed on the secondary side of the step-up transformer employed to drive the discharge lamp.

FIG. 2C shows another embodiment of the tank circuit 108" that is similar to the tank circuit 108' illustrated in FIG.

2B. However, the tank circuit 108" does not employ a discrete inductive component to form the second order filter for the tank. Instead, this embodiment uses an inherent leakage inductance 117 of the windings in the step-up transformer 114 as the inductive element of the second order filter. The elimination of a discrete inductive component to implement the second order filter of the tank circuit 108" reduces cost.

Figure 2D:
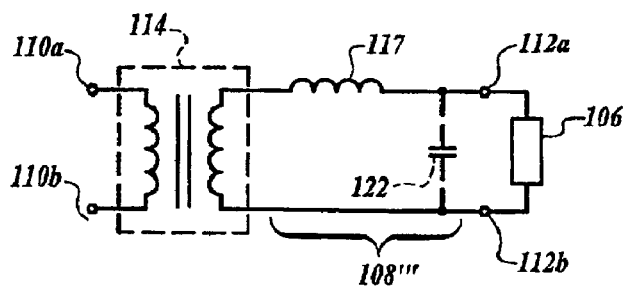
FIG. 2D is another exemplary schematic of another tank circuit disposed on the secondary side of the step-up transformer used to drive the discharge lamp.

FIG. 2D illustrates yet another embodiment of the tank circuit 108''' for further reducing the cost to implement the present invention. In this embodiment, the tank circuit 108''' uses a parasitic capacitance 122 of the lamp wiring (largest source), the secondary winding of the step-up transformer 114 and the transformer's inherent inductance 117 to form the second order filter. One end of the secondary winding for transformer 114 is connected to the lamp terminal 112a and the other end of the secondary winding is connected to the lamp terminal 112b. This embodiment eliminates the need for discrete inductive and capacitive components to implement a second order filter.

Figure 2E:
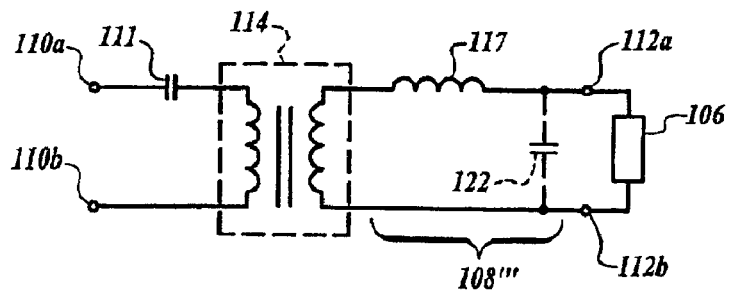
FIG. 2E is another exemplary schematic of another tank circuit that employs a primary coupling capacitor.

FIG. 2E shows another embodiment of the tank circuit 108''' that is substantially similar to the embodiment shown in FIG. 2D. However, in this case, the primary of the transformer 114 is coupled to the output of the IC 104 through a capacitor 111 which is used to cancel out the effect of the transformer's primary magnetizing inductance. The addition of the capacitor 111 causes the resonant frequency at the primary windings of the transformer 114 to more closely match the resonant frequency at the secondary winding of the transformer. In this way, the resonant frequency for the entire circuit, i.e., the tank circuit 108''' and the transformer 114, is brought closer to the resonant frequency at the secondary windings of the transformer.

Additionally, the largest source of parasitic capacitance for the various tank circuits shown in FIGS. 2A–2E is the wiring for the discharge lamp 106. It is also envisioned that a pair of parallel metal plates may be disposed on either side of a circuit board that includes the IC 104 so that a capacitive component is formed for the second order filter (tank circuit).

Figure 3A:
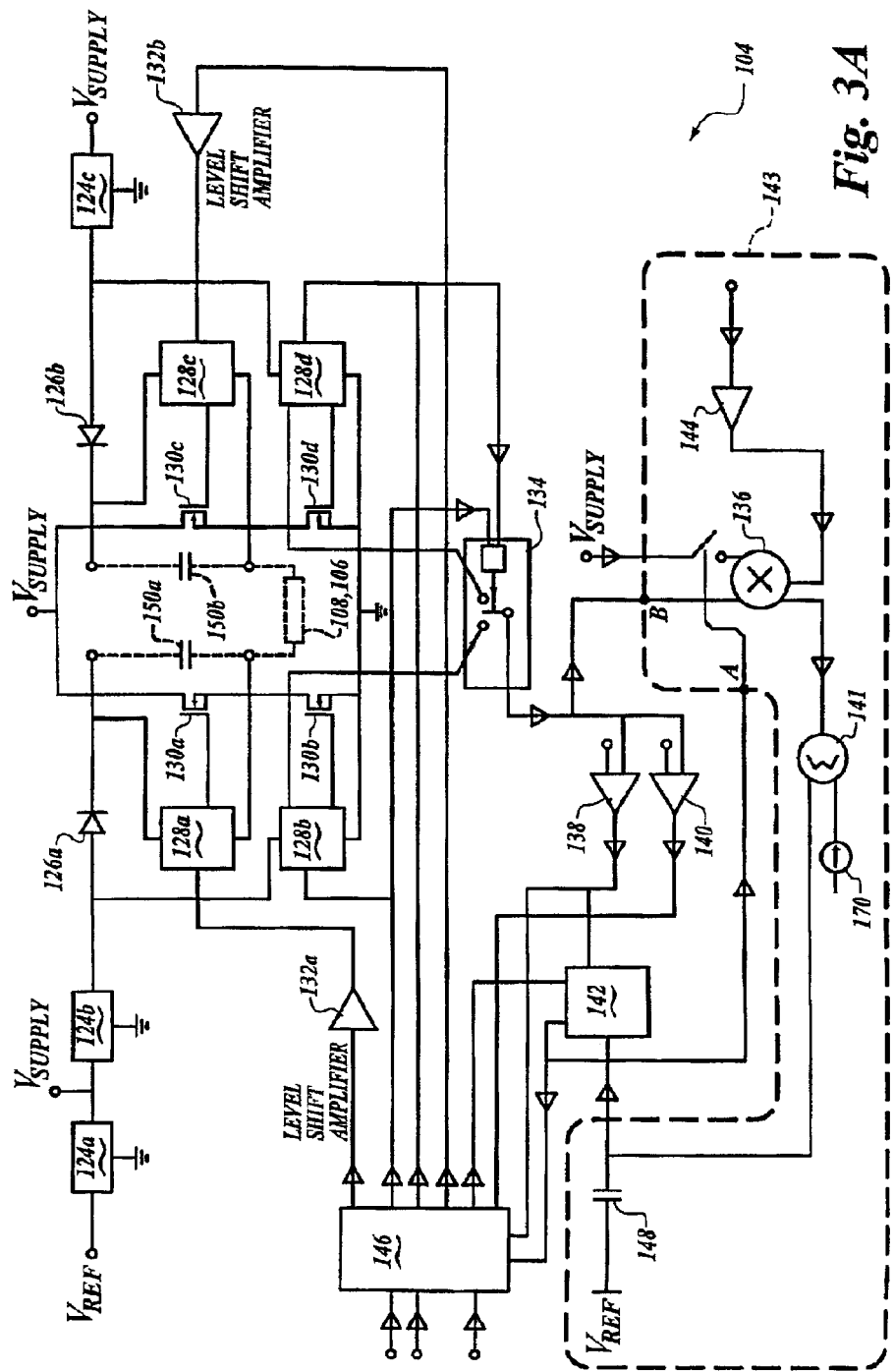
FIG. 3A is an exemplary schematic of a power control integrated circuit for driving the discharge lamp.

FIGS. 3A, 3B, 4 and 5 illustrate the internal circuitry of an integrated circuit (IC) for implementing the different embodiments of the invention. FIG. 3A shows an exemplary schematic of the power control embodiment of the IC 104. A Vref signal is provided as an output from a voltage regulator 124a that is coupled to a Vsupply signal. The Vref signal is a bandgap reference voltage which is nominally set to 5.0 Volts and it is used to derive various voltages used by separate components of the IC 104. Several internal voltages for a control logic block 146 are derived from the Vref signal, such as an UVLO (undervoltage lockout) signal and a master voltage reference for a thermal shutdown circuit. Also, the Vref signal derives other voltages that set trip points for a peak current (Ipk) comparator 138, a zero crossing detector 140 and a power control block 136.

A voltage regulator 124b is also coupled to the Vsupply signal and provides a regulated 6 Volt DC signal. The output of voltage regulator 124b is connected to a gate drive block 128b and an anode of a diode 126a whose cathode is connected to a gate drive block 128a and the BOOST LEFT terminal. Another voltage regulator 124c is coupled to the Vsupply signal and it provides a regulated 6 Volt DC signal to a gate drive block 128d. The output of the voltage regulator 124c is also connected to an anode of a diode 126b whose cathode is connected to a gate drive block 128c and the BOOST RIGHT terminal. Since the voltage regulators 124b and 124c separately regulate the voltage supplied to the relatively high power gate drive blocks 128a, 128b, 128c and 128d, the operation of any of the gate drive blocks tends to not significantly interfere with the Vref signal outputted by the voltage regulator 124a. Also, separate terminals for the gate drive blocks 128b and 128d are connected to earth ground.

Two level shift amplifiers 132a and 132b, have their respective input terminals separately connected to a control logic block 146 and their ouput terminals separately coupled to the gate drive blocks 128a and 128c, respectively. These level shift amplifiers translate the control logic signals from the logic level used in the control logic block 146 to the logic levels required by the gate drive blocks 128a and 128c, respectively.

An H-bridge output circuit for IC 104 is defined by the four power MOSFETs 130a, 130b, 130c and 130d. The drain terminal of the MOSFET 130a is coupled to the Vsupply signal and its gate terminal is coupled to gate drive block 128a. The source terminal of the MOSFET 130a is connected to the OUT LEFT terminal, the gate drive block 128a, the drain terminal of the MOSFET 130b, the gate drive block 128b, and a mux block 134. The source terminal of the MOSFET 130b is connected to earth ground and its gate terminal is coupled to the gate drive block 128b. Similarly, the drain terminal of the MOSFET 130c is connected to the Vsupply signal and its gate terminal is coupled to the gate drive block 128c. The source terminal of the MOSFET 130c is connected to the OUT RIGHT terminal, the gate drive block 128c, the drain terminal of the MOSFET 130d, the gate drive block 128d, and the mux block 134. Also, the source terminal of the MOSFET 130d is connected to ground and its gate terminal is coupled to the gate drive block 128d.

The source terminals of the MOSFETs 130b and 130d are coupled to earth ground (low side) and their respective gate drive blocks 128b and 128d include discrete digital logic components that employ a 0 to 5 Volt signal to control the operation of the associated power MOSFETs. The source terminals of the MOSFETs 130a and 130c are not connected to earth ground. Instead, these source terminals are connected to the respective OUT LEFT and OUT RIGHT terminals (high side) of the H-Bridge output circuit. In this arrangement, a 0 (ground) to 5 Volt signal may not reliably control the operation of the MOSFETs 130a and 130c. Since the gate drive blocks 128a and 128c employ discrete digital logic control signals, the invention provides for level shifting these control signals to a voltage that is always higher than the voltage at the source terminals of the associated MOSFETs 130a and 130c. The source terminal voltages tend to rise along with the voltage impressed across the OUT LEFT and OUT RIGHT terminals of the H-bridge output circuit. The level shift amplifiers 132a and 132b translate a 0 to 5 Volt logic signal that is referenced to ground into a 0 to 6 Volt logic signal which is referenced to the source terminal of the associated MOSFETs 130a and 130c. In this way, when the source terminals of the MOSFETs 130a and 130c have a potential anywhere between 0 Volts and 25 Volts, the gate drive blocks 128a and 128c are still able to control the operation of their associated MOSFETs.

The gate drive blocks 128a, 128b, 128c and 128d along with the level shift amplifiers 132a and 132b translate the control signals from the control block 146 into a drive signal for each of their associated power MOSFETs in the H-bridge output circuit. The gate drive blocks provide buffering (current amplification), fault protection, level shifting for the power MOSFET control signals, and cross conduction lockout. The gate drive blocks amplify the current of the digital logic signals so that relatively high currents may be provided for the rapid switching of the state of the power MOSFETs between the on (conduction) and off (non-conduction) states. Each of the four power MOSFETs is current limited by its associated gate drive blocks to approximately 5 Amperes when an output fault occurs such as a short from the OUT LEFT terminal and/or the OUT RIGHT terminal to the Vsupply rail or a short to earth ground. Under such an output fault condition, the gate drive block will turn off the associated power MOSFET before any damage occurs.

All four of the power transistors in the preferred embodiment are MOSFETs, and they tend to have a high input capacitance. To quickly switch a power MOSFET between the conduction and non-conduction states, the gate drive block provides for driving large currents into the gate terminal of the respective power MOSFET. The gate drive blocks amplify the small currents available from control signals produced by the discrete digital logic elements in the blocks to a relatively higher current level that is required to quickly switch the state of the power MOSFETs.

When the gate drive block applies a voltage signal (6 volts with respect to the source terminal) to the associated power MOSFET's gate terminal, the MOSFET will turn on (conduct). Also, the power MOSFET will turn off (non-conduct) when zero volts is applied to its gate terminal with respect to its source terminal. In contrast, the source terminals of the two power MOSFETs 130a and 130c are connected to the respective left output and right output terminals. This configuration causes the source terminal voltage to float for each of these power MOSFETs in a range from earth ground to Vsupply minus the voltage drop across the respective power MOSFET. The gate drive blocks 128a and 128c apply a level shifted voltage signal to the gate terminal of the associated power MOSFET with a range of zero to +6 volts relative to the floating source terminal voltage. In this way, a 0 to 5 Volt ground-referenced signal from the control block 146 is translated into a 0–6 Volt signal (buffered for high current) relative to the potential at the source terminals of the power MOSFETs 130a and 130c.

Each of the gate drive blocks also provide logic for controlling the cross conduction lockout of the power MOSFETs. If both an upper and lower power MOSFET, e.g., power MOSFETs 130a and 130b, are conducting at the same time, then "shoot through" currents will flow from the input power supply to ground which may possibly destroy these power MOSFETs. The gate drive blocks prevent this condition by simultaneously examining the value of the gate terminal voltages for both the upper and lower power MOSFETs. When one of the gate drive blocks (upper or lower) detects an "on" voltage at the gate terminal of the associated MOSFET, then the other gate drive block is locked out from also applying the on voltage to its associated gate terminal.

The gate drive blocks 128a and 128c provide for initializing a pair of bootstrap capacitors 150a and 150b during startup (initial energization) of the present invention. Bootstrap capacitor 150a is connected between the OUT LEFT terminal and the BOOST LEFT terminal. As discussed above, the OUT LEFT terminal is also connected to the source terminal of the power MOSFET 130a and the gate drive block 128a. In this way, the bootstrap capacitor 150a is charged by the diode 126a when the lower power MOSFET 130b is conducting and the upper power MOSFET 130a is non-conducting. Once charged, the bootstrap capacitor 150a will provide a stable turn on voltage to the gate terminal of the upper power MOSFET 130a even as the potential at the source terminal of the upper MOSFET is rising to approximately the same potential as Vsupply. Similarly, the bootstrap capacitor 150b is connected between the OUT RIGHT terminal and the BOOST RIGHT terminal to perform substantially the same function. Also, the lamp 106 and the tank circuit 108 are coupled between the OUT LEFT terminal and the OUT RIGHT terminal of the H-bridge output circuit.

During initialization, i.e., startup, of the IC 104, the lower power MOSFETs 130b and 130d are switched on (conduction) by gate drive blocks 128b and 128d so that charge is simultaneously provided to the bootstrap capacitors 150a and 150b. When the H-Bridge output circuit begins to oscillate and supply electrical power to the CCFL, the bootstrap capacitors 150a and 150b will sequentially partially discharge and recharge during the normal switching cycle of the power MOSFETs. The diodes 126a and 126b automatically recharge their associated bootstrap capacitors 150a and 150b when their associated power MOSFETs 130a and 130c are turned off in the switching cycle. In this way, the bootstrap capacitors enable the gate drive blocks 128a and 128c to provide an adequate and stable turn on voltage to the gate terminals of the associated MOSFETs 130a and 130c.

To minimize the effect of surge requirements on the battery and "in rush" current to the lamp, both a soft on and soft off are implemented. The term "soft on" is used to describe a gradual increase in system power to the normal level and "soft off" describes a gradual decrease in system energy from the normal level. The amount of energy delivered to the system is related to the output pulse width and can be adjusted by summing current at the Comp pin. Additional current forced into the Comp pin results in wider pulse widths, while current pulled from the Comp pin results in narrower pulse widths. Specifically, near the end of a burst, current is pulled from the Comp pin in order to reduce the widths of the output pulses. In one embodiment, when the Comp pin is approximately 50 mV above ground and the pulse widths are near minimum the burst is allowed to terminate. When the next burst is initiated the Comp pin is near ground resulting in initially narrow pulses. A current is then sourced to the Comp pin resulting in a gradual increase in pulse width until normal operation is reached.

Importantly, the energy of the power delivered to the load during the beginning of startup is different from that during normal operation. Specifically, in one embodiment, the width of the first pulse is larger than that of normal operation. In one embodiment, the initial energy pulse is twice as long as the pulses during normal operation. This has been found to increase the ability of the inverter to strike the CCFL under different environmental and equipment conditions.

The mux block 134 switches between the drain terminals of the power MOSFETs 130b and 130d, so that the current flowing through the power MOSFETs may be determined by the control logic block 146. The current is determined by measuring the voltage across the power MOSFETs when they are on, i.e., conducting. The measured voltage is directly related to the amount of current flowing through the power MOSFET by its "on" resistance, which is a known value. Since the mux block 134 switches between the drain terminals of the power MOSFET that is turned on, the mux block output voltage is proportional to the current (Isw) flowing through the particular MOSFET that is turned on. The mux block 134 is a pair of analog switches that commutate between the drain terminals of the lower power MOSFETs.

A peak current (Ipk) comparator 138 has an input coupled to the output of the mux block 134 and another input coupled to a predetermined voltage, e.g., 200 mV that is derived from the Vref signal. An output of the peak current comparator 138 is coupled to the control logic block 146 and an on-time timer 142. The peak current comparator 138 output indicates to the control logic block 146 when a predetermined maximum current level has been exceeded. If the lamp 106 is extinguished or broken, the current flowing through the power MOSFETs will build to a relatively high value as the IC 104 tries to drive the requested amount of power or current into the relatively low loss tank circuit components. Since a relatively high current flowing into the tank circuit's capacitor may result in a dangerously high voltage at the secondary of a step-up transformer, the control logic block 146 will turn off the power MOSFET when this condition is indicated by the peak current comparator 138.

An input of a zero crossing detector 140 (comparator) is coupled to the output of the mux block 134 and another input is coupled to a predetermined voltage, e.g., 5 mV that is derived from the Vref signal. The output of the zero crossing detector 140 is coupled to the control logic block 146 for indicating when the current in the tank circuit has almost fallen to zero Amps. The control logic block 146 uses the output of the zero crossing detector 140 to determine when the rest phase should be terminated and initiate the next power phase in the cycle, e.g., power phase A or power phase B as presented in the discussion of FIG. 6 below.

The on-time timer 142 determines the duration of each power phase for the control logic block 146. One input to the on-time timer 142 is coupled to an end of a loop compensation capacitor 148 and the output of the power control block 136. Another end of the loop compensation capacitor 148 is coupled to the Vref signal. The on-time timer 142 determines the period of time (duration) for each power phase in accordance with the value of the voltage on the loop compensation capacitor 148. The on-time timer 142 is separately coupled to an input and an output of the control logic block 146 and the output of the peak current (Ipk) comparator 138. Also, the on-time timer 142 will indicate to the control logic block 146 when the period of time for each power phase has elapsed. In one embodiment, the on-time timer 142 is operative to provide a pulse width 2.5 times as long as the pulses in normal operation.

The brightness opamp 144 has an output coupled to a power control (analog multiplier) block 136. An input to the brightness opamp 144 is coupled to a user selectable potentiometer (not shown) for receiving a voltage related to the setting of the potentiometer. When the user selects a control associated with the potentiometer a voltage is impressed by the brightness opamp's output at the power control block 136 that either proportionally increases or decreases in relation to the disposition of the control. Further, as the voltage is changed by the user selecting the control, the on-time timer 142 will indicate a corresponding change in the period of time for each power phase to the control logic block 146.

The power control block 136 provides a signal as an input to a summing node 141 that also inputs a reference current from a constant current (Iref) source 170. The output of the summing node 141 is coupled to the on-time timer 142 and an end of the loop compensation capacitor 148.

The switching of the mux block 134 is coordinated by the control logic block 146, so that only one power MOSFET current at a time is measured. Also, the control logic block 146 measures the currents flowing through the lower H-bridge power MOSFETS 130b and 130d to synchronize the power phase of the present invention with the current of the tank circuit, determines when the current flowing through the power MOSFETs has exceeded a predetermined maximum peak current (Ipk), and computes the actual power that is delivered to the load.

Generally, there are two types of cycle phases that the control logic block 146 manages, i.e., the power phase and rest phase. The power phase occurs when diagonally opposed power MOSFETs are conducting. For example, power phase A occurs when the power MOSFETs 130a and 130d are on. Similarly, power phase B occurs when power the MOSFETs 130b and 130c are on. In both power phases, the control logic block 146 will enable current to flow through the power MOSFETs until one of the following events is indicated: (1) the peak current (Ipk) comparator 138 detects that the maximum current limit is exceeded such as when the discharge lamp is out; (2) the on-time timer 142 has timed out; or (3) the zero crossing detector 140 provides an indication to the control logic block 146 to switch the state of the MOSFETs to the next power phase in the cycle.

In a typical embodiment, when the on-time timer 142 has timed out in power phase A, the control logic block 146 will switch the power MOSFETs to the rest phase. In the rest phase, the lower H-bridge power MOSFETs 130b and 130d turn on and both upper H-bridge power MOSFETs 130a and 130c turn off. Although the tank (output) circuit 108 coupled to the OUT LEFT and OUT RIGHT terminals may continue to provide current to the CCFL 106 for a brief period of time, the tank circuit's current will rapidly return to zero at which point the zero crossing detector 140 will indicate this zero current condition to the control logic block 146. Next, the control logic block 146 will direct power MOSFETs 130c and 130b to turn on and power MOSFETs 130a and 130d to turn off. The control logic block 146 continuously cycles the power MOSFETs from the power phase A to the rest phase to the power phase B to the rest phase and back to the power phase A at the resonant frequency of the load. The control logic block controls the amount of power/current driving the discharge lamp by varying the amount of time spent resting (rest phase) in relation to the amount time spent adding energy (power phase) to the tank circuit.

Another embodiment provides for the control logic block 146 to use the indication from the peak current comparator 140 to determine when to switch between phases. In this case, the control logic block 146 directs the power MOSFETs to directly toggle (switch) between the A and B power phases so that the rest phase is skipped entirely. In this mode of operation, the current waveform into the tank circuit has a triangular shape because the control logic block 146 actively drives the tank circuit's current back the other way when the peak current comparator 140 indicates that the "peak" current has been reached. This embodiment serves to constrain/control the current provided by the tank circuit 108 and limit the open circuit voltage at the discharge lamp terminals. Either embodiment may be selected during the manufacture of the IC 104 with a simple metal mask option.

There are at least two asynchronous digital logic inputs to the control logic block 146 and they include: (1) a chip enable input for turning the IC 104 on or off, and (2) a thermal shutdown input that provides for internal thermal protection of the IC 104. Another digital input to the control logic block 146 is a multifunctional test/burst input. In product testing of the IC 104, this input is used to halt the execution of the start up initialization steps so that various parameters of the IC may be tested. However, once the product testing is complete, this digital logic input may be used to implement "burst mode" dimming.

In burst dimming mode, the user drives the burst input with a rectangular logic waveform, in one state this input commands the IC 104 to operate normally and deliver power to the lamp 106. In the other state the burst input causes the IC 104 to suspend normal operation and stop delivering power to the lamp 106. The burst input is normally switched off and on at a fast enough rate to be invisible (typically on the order of 180 Hz or greater) for dimming the light emitted by the lamp 106. When the burst dimming mode is asserted, the loop compensation capacitor 148 stops recharging or discharging, i.e., the voltage impressed on the loop compensation capacitor 148 is saved so that the proper power level is quickly resumed when the burst dimming mode is de-asserted. Also, in the burst dimming mode, a relatively greater range of dimming for the lamp 106 is provided than a range provided by a typical analog dimming mechanism because the effect of parasitic capacitances is reduced.

Additionally, full output and analog dimming is supported by the IC 104 with other inputs to the control logic block 146 such as inputs from the peak current (Ipk) comparator 138, the on-time timer 142, and the zero crossing detector 140.

Figure 4:
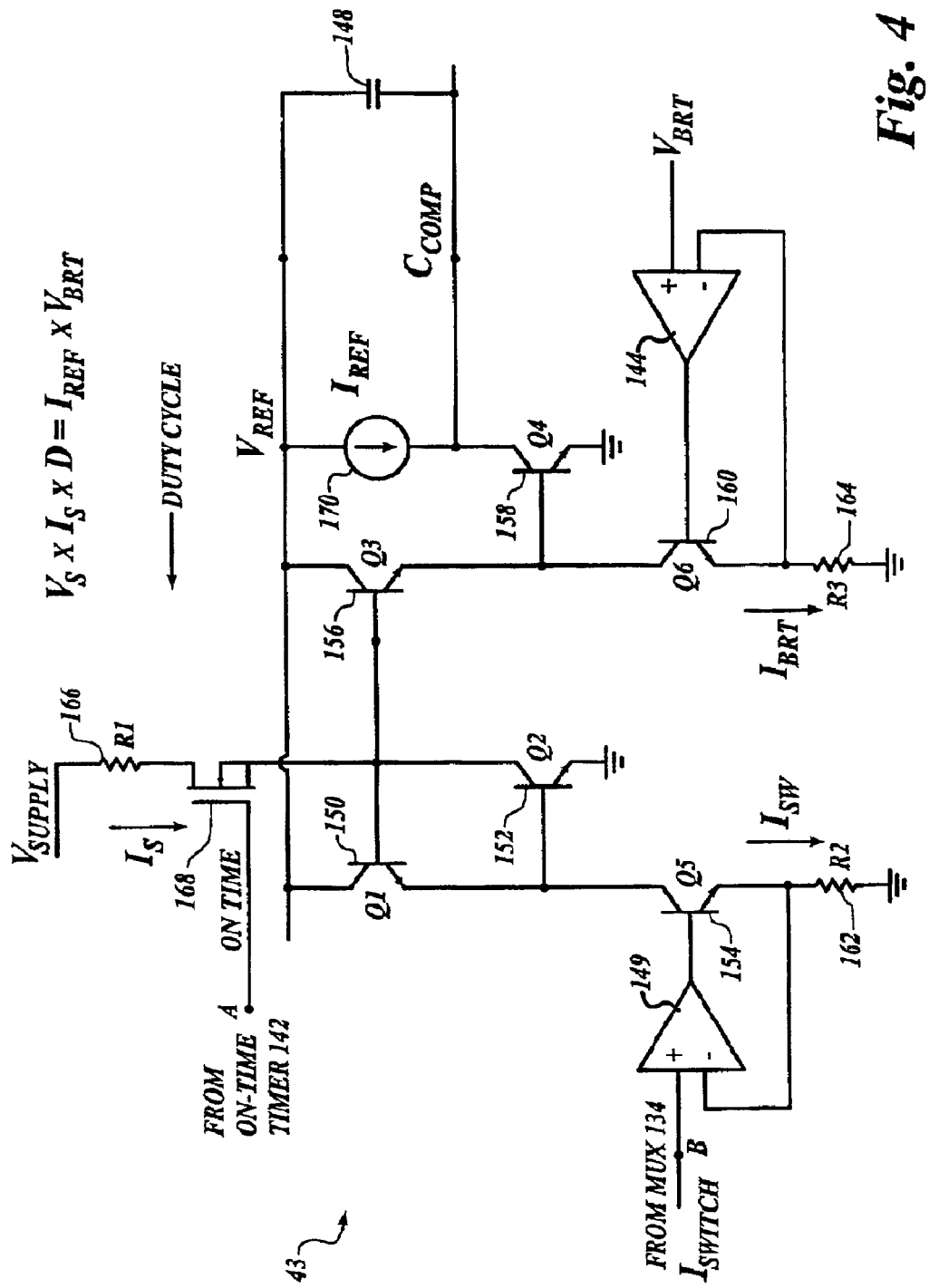
FIG. 4 is an exemplary schematic of a power control block implemented by the power control integrated circuit.

FIG. 4 illustrates an exemplary schematic 143 of the components employed to control the operation of the IC 104 with the amount of power driving the tank circuit 108. Since losses in the tank circuit 108 and the transformer 114 are approximately constant over the entire range of the AC signal driving the load, the input power to the load correlates to the actual power driving the CCFL 106 in the tank circuit 108. Also, the power control block 136 is a metal mask option that must be selected during the manufacture of the IC 104.

Making use of the logarithmic relationship between the base-emitter voltage (Vbe) and collector current (Ic) of a bipolar transistor, a simple multiplier is implemented in the following manner. In one portion of the power control block 136, an end of a resistor 166 is coupled to the Vsupply signal and another end is coupled to a drain terminal of a MOSFET 168. A gate terminal of the MOSFET 168 is coupled to the output of the on-time timer 142 (not shown here). The on-time timer 142 modulates the duty cycle of the current through the MOSFET 168 by controlling the voltage at the gate terminal synchronous with the output power phase waveform. A source terminal of the MOSFET 168 is coupled to a base of an NPN transistor 150, a base of an NPN transistor 156, and a collector of an NPN transistor 152. A collector of the NPN transistor 150 is connected to the Vref signal. An emitter of the NPN transistor 150 is coupled to a base of the NPN transistor 152 and a collector of an NPN transistor 154. An emitter of the NPN transistor 152 is coupled to ground and an emitter of the NPN transistor 154 is coupled to an end of a resistor 162 and an inverting input to an opamp 149. Another end of resistor 162 is connected to ground. Also, a non-inverting input to the opamp 149 is coupled to the output from the mux block 134 (not shown here) and an output of the opamp is coupled to a base of the NPN transistor 154.

In another portion of the power control block 136, an emitter of the NPN transistor 156 is coupled to a base of an NPN transistor 158 and a collector of an NPN transistor 160. An emitter of the NPN transistor 158 is coupled to ground and a collector is coupled an end of the loop compensation capacitor 148 and an output of a constant current (Iref) source 170. The other end of the loop compensation capacitor 148, an input to the constant current (Iref) source 170 and a collector of the NPN transistor 156 are coupled to the Vref signal. An emitter of the NPN transistor 160 is coupled to one end of a resistor 164 and the inverting input to the brightness opamp 144. Another end of the resistor 164 is connected to ground. A base of the NPN transistor 160 is coupled to an output of the brightness opamp 144. Although not shown, the non-inverting input to the brightness opamp 144 is coupled to a potentiometer for enabling a user to "dim" the amount of light emitted by the lamp 106.

In the following analysis (description) of the operation of the power control block 136, certain quantities may be neglected, compared to other, more significant quantities without compromising the results of the analysis. In particular, the various NPN transistor base currents are neglected compared to the NPN transistor collector currents. Also, the supply voltage is assumed to be large compared to the sum of the base-emitter voltages of the NPN transistor 150 and the NPN transistor 152.

The power control block 136 determines the amount of power delivered to the load by measuring a corresponding amount of power drawn from the power supply. Also, the current either into or out of the loop compensation capacitor 148 is the difference of a constant and a multiply and divide performed in the power control block 136.

During a power phase, the first multiplication is created when the on-time timer 142 supplies the turn on voltage to the gate terminal of the MOSFET 168 which causes the NPN transistors 150 and 152 to conduct and provide a turn-on voltage to the base of the NPN transistor 156. Also, the opamp 149 will cause the NPN transistor 154 to conduct a current proportional to the output power switch current when the mux block 134 has switched a drain terminal voltage (Vswitch) from the selected lower power MOSFET to the input of the opamp.

The collector current of the NPN transistor 150 is equal to the collector current of the NPN transistor 154. Similarly, the collector current of the NPN transistor 152 is equal to the supply voltage (Vsupply) divided by the resistor 166. The base-emitter voltage of the NPN transistor 150 is proportional to the logarithm of the current in the output switch. Similarly, the base-emitter voltage of the NPN transistor 152 is proportional to the logarithm of the supply voltage. Thus, the voltage (with respect to ground) at the base terminal of the NPN transistor 150 is proportional to the logarithm of the product of Vsupply times Iswitch. It is important to note that this voltage is chopped, i.e., gated, by the duty cycle of the output waveform.

The voltage at the base of the NPN transistor 150 is equal to the voltage at the base terminal of the NPN transistor 156. The collector current of the NPN transistor 160 is proportional to the (externally-provided) brightness control voltage. Also, the collector current of the NPN transistor 156 is equal to the collector current of the NPN transistor 160. Furthermore, the base-emitter voltage of the NPN transistor 156 is proportional to the logarithm of the brightness control voltage. Thus, the voltage (with respect to ground) at the base terminal of the NPN transistor 158 is proportional to the logarithm of (Vsupply*Iswitch/Vbright).

The collector current of the NPN transistor 158 must be proportional to the anti-logarithm of its base voltage, i.e., the collector current of the NPN transistor 158 is proportional to (Vsupply*Iswitch/Vbright). The collector current of the NPN transistor 158 is averaged by the loop compensation capacitor 148. The action of the control loop ensures that the average of the collector current of the NPN transistor 158 is equal to the constant current (Iref) source 170.

For example, when (Vsupply*Iswitch*duty cycle)> (Iref*Ibrt), extra current flows into the loop compensation capacitor 148 at the COMP terminal from the constant current (Iref) source 170, which has the effect of shortening the duty cycle provided by the on-time timer 142 and reducing the power supplied to the load. However, if (Vsupply*Iswitch*duty cycle)<(Iref*Ibrt), the loop compensation capacitor 148 will discharge slightly and the on-time timer 142 will increase the length of the duty cycle until the power drawn from the Vsupply is equal to the power demanded by the control voltage at the non-inverting input to the brightness amplifier. The integrated circuit 104 modulates the duty cycle on the MOSFET 168 and the power MOSFETs 130a, 130b, 130c and 130d until the voltage on the COMP terminal stops changing. In this way, negative feedback at the COMP terminal is used to modulate the duty cycle provided by the on-time timer 142.

Figure 5:
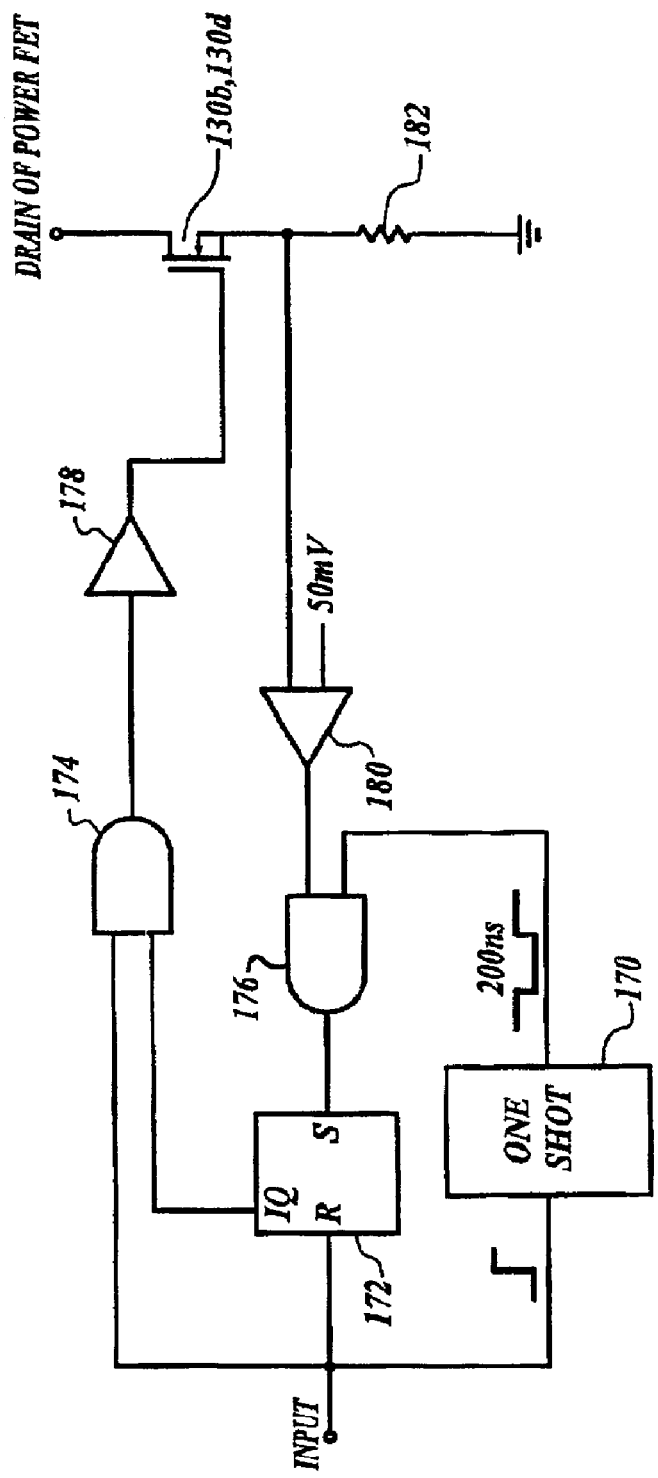
FIG. 5 is an exemplary schematic of a gate drive block implemented by the current control and power control integrated circuits.

FIG. 5 shows how, in addition to buffering the low current logic signals, an exemplary gate drive block 128b may also provide a local current limit for the associated power MOSFET 130b while it is on. An input to the gate drive block 128b is coupled to an input of a one shot timer 170, a reset input to an R-S flip-flop 172 and an input to an AND gate 174. An output of the flip-flop 172 is coupled to another input to the AND gate 174 and the set input of the flip-flop is coupled to an output of an AND gate 176. The output of AND gate 174 is coupled to an input of an inverter 178 that has an output connected to the gate of the MOSFET 130b. An output of the one shot timer 170 is connected to an input to the AND gate 176. A current limit comparator 180 has an output connected to another input to the AND gate 176. One input to the comparator 180 is coupled to an approximately 50 millivolt signal derived from the Vref signal and another input is coupled to the source terminal of the MOSFET 130b and an end of a resistor 182. The value of the resistor 182 is sized to provide a predetermined voltage at the input to the comparator 180 when five or more Amps of current are flowing through the resistor to ground.

The one shot timer 170 provides a signal approximately 200 nanoseconds after the power MOSFET 130b has turned on during the power phase (long enough for the switching noise to stop). The output signal of the one shot timer 170 enables the output of the current limit comparator 180 to be provided by the AND gate 176 to the set input of the flip-flop 172. If the output of the current limit comparator 180 indicates that the current limit voltage on the resistor 182 has been reached, the flip-flop will output a turn-off signal to the AND gate 174 which in turn outputs the turn-off signal to the inverter 178 so that a turn off voltage is applied to the gate terminal of the MOSFET 130b. In this way, the power MOSFET 130b is immediately turned off for the remainder of a power phase when a current greater than five Amps flows through the power MOSFET. Similarly, the gate drive block 128d provides for limiting the current flow through the MOSFET 130d in substantially the same way.

Figure 3B:
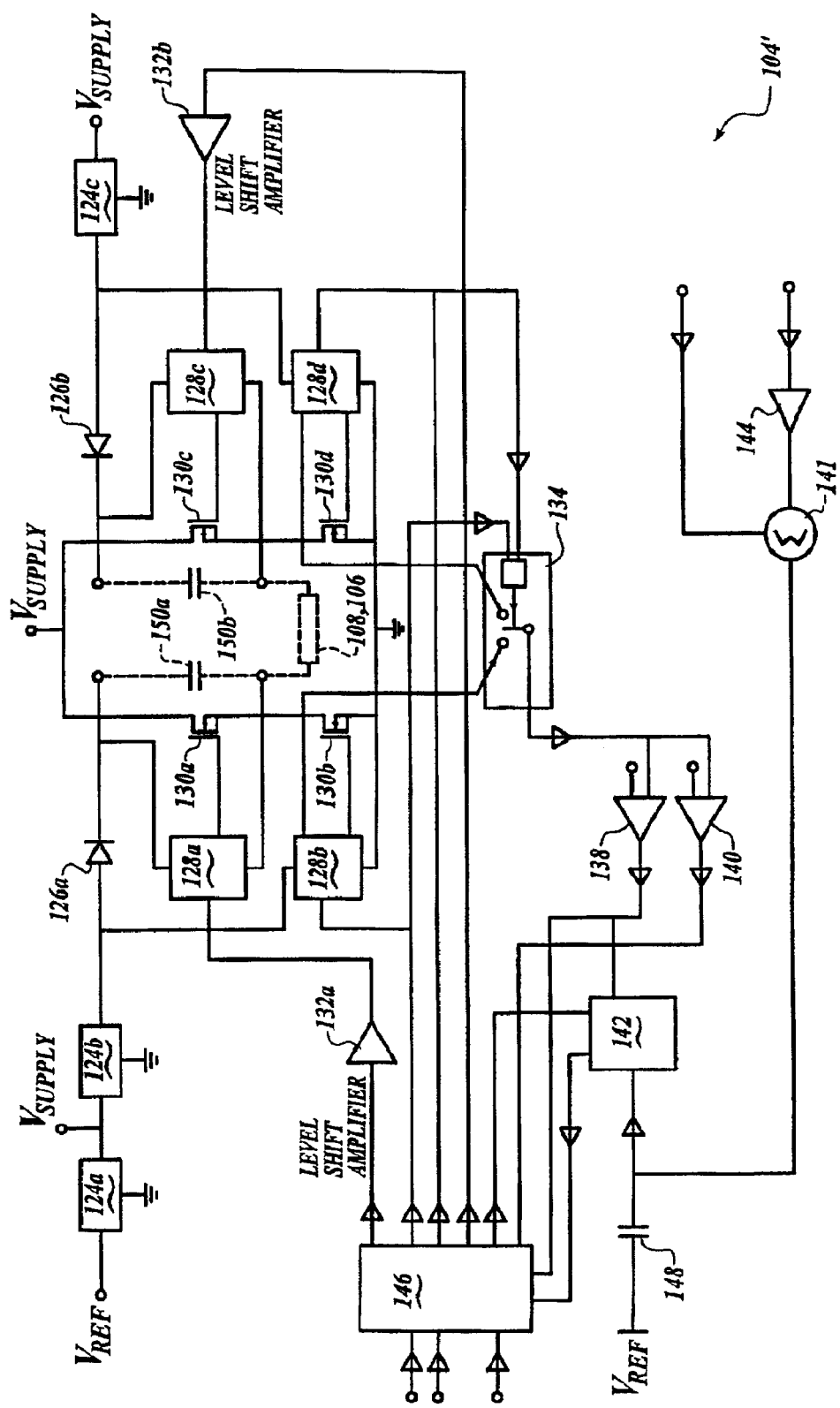
FIG. 3B is an exemplary schematic of a current controlled integrated circuit for driving the discharge lamp.

FIG. 3B shows an exemplary schematic of a current control embodiment of the invention as implemented by an IC 104'. Although the schematic of the current control IC 104' is similar to the power control IC 104, there are some differences. Since current control is employed by the IC 104' to regulate the electrical power supplied to the lamp 106, the power control block 136 is not provided in the IC. 104'. Also, the output of the brightness opamp 144 is provided to the summing node 141 which also receives an Isense current through a connection to the sense resistor 109 as shown in FIG. 1B. Similarly, the output of the summing node 141 is provided to the end of the loop compensation capacitor 148 and the on-time timer 142. The current through the sense resistor 109 proportionally approximates the amount of current flowing through the lamp 106. The IC 104' uses this approximation to control the amount of electrical power driving the lamp 106.

The current control version of the IC 104' uses the brightness opamp 144 to convert the user input at the potentiometer into a current (Ibright) that the summing node 141 compares to the Isense current and the current difference flows either into or out of the loop compensation capacitor 148. In contrast, the power control version of the IC 104 performs the following generalized steps: (1) employ the brightness opamp 144 to convert the user input into the Ibright current; (2) use the analog multiplier to logarithmically add (multiply) currents proportional to the Iswitch current, Vsupply and the duty cycle; (3) employ the analog multiplier to logarithmically subtract (divide) the Ibright current from the logarithmically added currents; (4) compare the result of the antilogarithm of the subtraction to the Ireference current to determine a differential current; and (5) employ the differential current to either charge or discharge the compensation capacitor 148 so that the on-time timer 142 will adjust the time interval of each power phase relative to the voltage impressed across the loop compensation capacitor 148 by the amount of stored charge.

Figure 6:
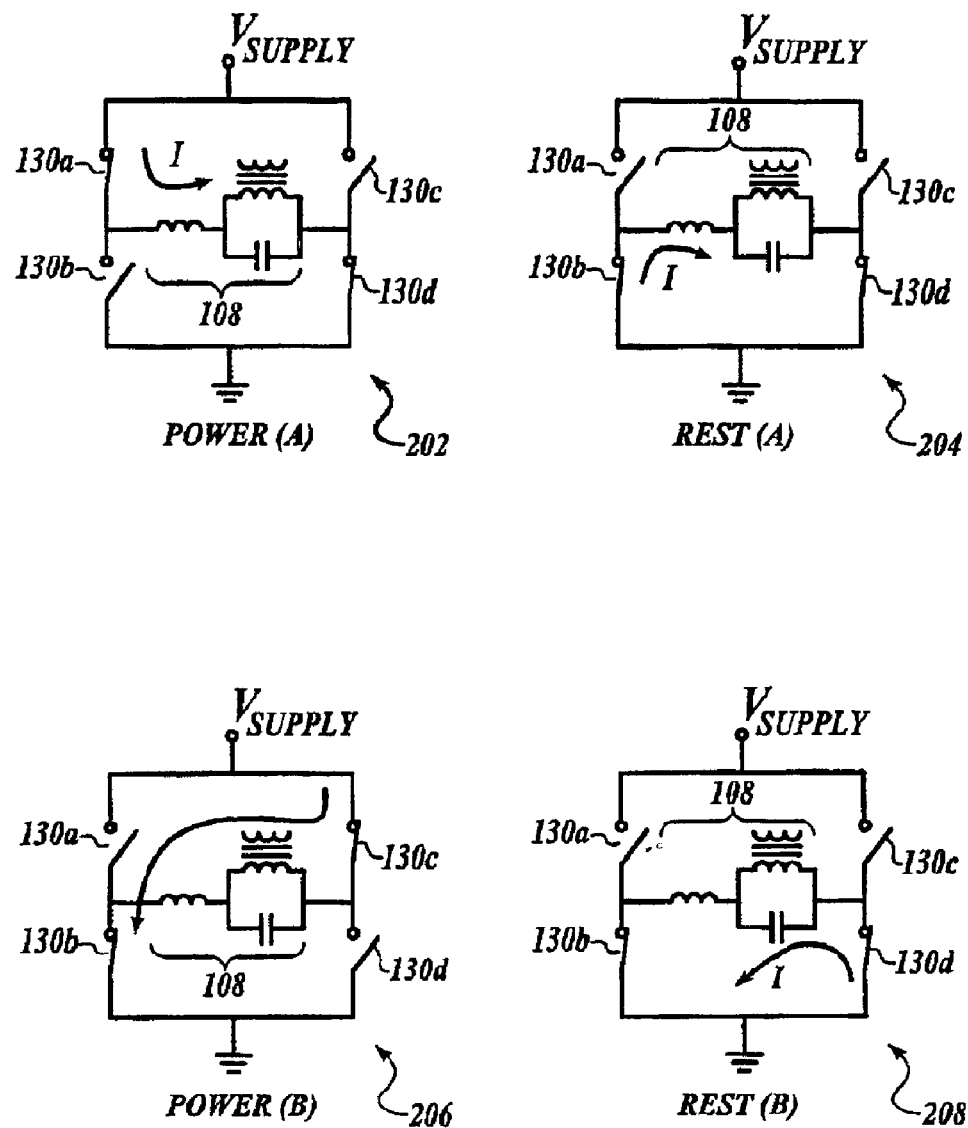
FIG. 6 is an exemplary overview of the various phases of the oscillation cycle of the invention.

Looking now to FIG. 6, a schematic overview 200 shows the present invention configured in four operational modes or phases that complete a cycle for driving a load with an AC signal. All four phases, i.e., a power phase "A" 202, a rest phase "A" 204, a power phase "B" 206, and a rest phase "B" 208, employ the same components. The power MOSFETs 130a, 130b, 130c and 130d are illustrated as discrete switches. When a power MOSFET is on (conducting), it is represented as a closed switch. Also, when the power MOSFET is off (non-conducting), it is represented as an open switch. In this way, the state of conduction for the power MOSFETs may be more clearly illustrated for the different phases of the cycle.

An end of the power transistor 130a is connected to the Vsupply terminal and the other end is coupled to an end of the power transistor 130b and an end of the tank circuit 108. One end of the power transistor 130c is connected to the Vsupply signal (DC supply) and the other end is connected to the other end of the tank circuit 108 and one end of the power transistor 130d. The other ends of power transistors 130b and 130d are connected to ground.

As illustrated in power phase "A" 202, diagonally opposite power transistors 130b and 130c are off (open position) and power transistors 130a and 130d are on (closed position). A DC current from the Vsupply terminal flows through the power transistor 130a, passes through the tank circuit 108 and returns to earth ground through power transistor 130d.

When the flow of current from the Vsupply terminal is at least equal to a predetermined peak value as indicated by the peak current comparator 138 or the on-time timer 142 has finished, the power transistors will switch from power phase "A" 202 to the configuration identified as rest phase "A" 204. However, if neither of these conditions has occurred and the tank current has returned to the zero crossing point as indicated by the zero crossing detector 140, the power transistors will bypass the rest phase "A" and switch directly to the configuration identified as a power phase "B" 206. Typically, the bypassing of the rest phase will occur when there is a high load and a relatively low Vsupply voltage.

Rest phase "A" 204 is shown with the top laterally opposite power transistors 130a and 130c disposed in the open position (off) and the bottom laterally opposite power transistors 130b and 130d configured in the closed position (on). In the rest phase "A" 204 configuration, the tank circuit 108 discharges stored energy, i.e., a current, through power transistor 130d to ground. After the tank circuit has discharged at least a portion of its stored energy, the power transistors switch to the configuration identified as the power phase "B" 206. The present invention provides for tracking the resonant frequency of the tank circuit and switching the power transistors at this frequency, so that the tank circuit will store energy during the power phase "A" 202 and discharge this energy during the rest phase "A". In this way, the AC signal impressed across the load coupled to the tank circuit has a relatively smooth sinusoidal shape for the "A" portion of the AC signal cycle.

Similarly, the power phase "B" 206 illustrates diagonally opposite power transistors 130a and 130d disposed in an open position and power transistors 130b and 130c in a closed position. A current from the Vsupply terminal flows through the power transistor 130c, passes through the tank circuit 108 and returns to ground through power transistor 130b. When the flow of current from the Vsupply terminal is at least equal to a predetermined peak current value indicated by the peak current comparator 138 or the on-time timer 142 has timed out, the power transistors switch from the power phase "B" 206 to the configuration identified as the rest phase "B" 208.

Rest phase "B" 208 is shown with top laterally opposite power transistors 130a and 130c disposed in the open position and the power transistors 130b and 130d configured in the closed position. In the rest phase "B" 208, the tank circuit 108 will discharge stored energy, i.e., a current, through power transistor 130b to ground so that the AC signal impressed across the load coupled to the tank circuit has a smooth sinusoidal shape for the "B" portion of the AC signal cycle. After discharging the stored energy for a period of time, the power transistors will switch to the power phase "A" configuration and the cycle of phases will repeat. In this way, power is transferred to the load continuously throughout the cycle (both power and rest phases) and the stored energy in the tank circuit 108 is replenished during each power phase.

The present invention provides for dimming a lamp, i.e., reducing the amount of power delivered to the load, by decreasing the period of time that the power transistors are disposed in the power phase "A" and the power phase "B" configuration and proportionally increasing the period of time that the transistors are disposed in the rest phase "A" and the rest phase "B" positions.

Under normal operating conditions, the lamp current (or power) is measured and compared in a feedback loop to the user input (setting of the potentiometer). An error (difference) between the measured value of the lamp current and the user input is employed to determine the value of the voltage across the loop compensation capacitor 148 that is subsequently employed by the on-time timer 142 to determine the length of time that the power transistors are turned on for the power phases. In this way, the user may control the brightness of the lamp 106 over a relatively large range by adjusting the setting of the potentiometer.

FIGS. 7A–7D includes four graphs that illustrate the correspondence between a AC voltage signal generated by the present invention and the current supplied to the load, i.e., the CCFL, under maximum power and reduced power conditions. In a top row graph 210, a horizontal time axis 216 and a vertical voltage axis 218 are shown. As is typical of an H-bridge configuration, the peak voltage amplitude 212 and 214 is equal to the voltage provided by the power supply and the peak-to-peak load voltage is twice the supply voltage. A substantially straight, vertical rising edge 220 occurs at the zero crossing of the tank circuit's current each time the negative waveform 214 transitions to the positive waveform 212. Similarly, a vertical falling edge 222 occurs when the power phase terminates for one of the three reasons that power phases terminate as discussed above. Additionally, the graph 210 shows the voltage waveform shape when the IC 104 is delivering the maximum power/current to the tank circuit for each of the half cycles of the tank's resonant frequency. Typically, this waveform is observed when the circuit is delivering design maximum power to the load at design minimum supply voltage.

Figure 7A:
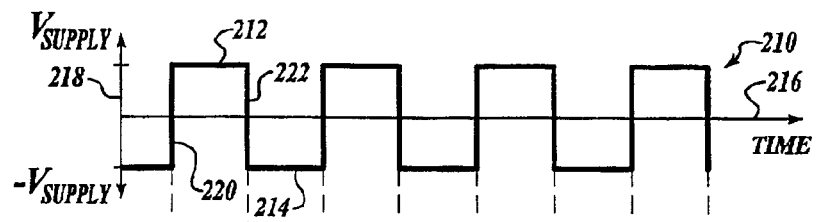
FIGS. 7A–7D displays four graphs for the corresponding voltage and current waveforms that are generated when driving the discharge lamp at both maximum and partial duty cycle.
Figure 7B:
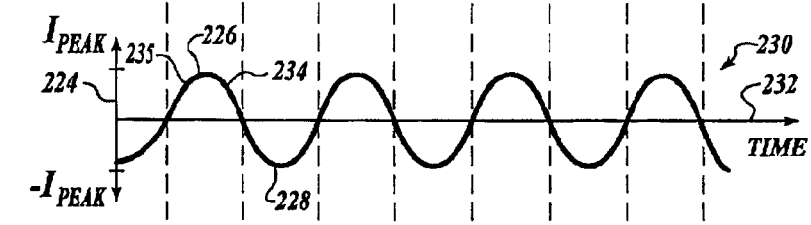

In a second row graph 230 of FIG. 7B, a horizontal time axis 232 and a vertical current axis 224 are displayed that correspond to the voltage waveform illustrated in the graph 210. The maximum value of the positive current waveform 226 is equal to a positive peak current value. Similarly, the maximum value of the negative current waveform 228 is equal to a negative peak current value. A rounded falling edge 234 occurs at the resonant frequency of the tank circuit 108 when the positive current waveform 226 has finished charging up the circuit. Similarly, a rounded rising edge 235 occurs at the resonant frequency of the tank circuit 108 when the circuit is just beginning to charge up.

Figure 7C:
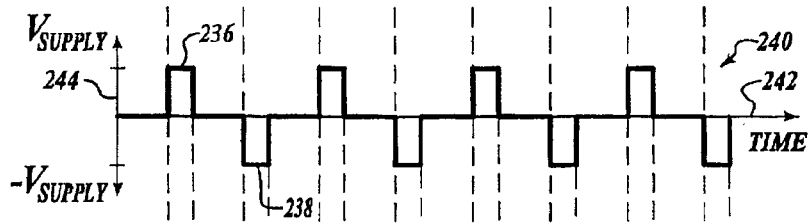

In a third row graph 240 of FIG. 7C, a horizontal time axis 242 and a vertical voltage axis 244 are displayed. The peak voltage amplitude delivered to the load by the voltage waveforms 236 and 238 are equal to the supply voltage and the peak-to-peak load voltage is twice the supply voltage. In graph 240, the duty cycles of both the positive-going waveforms 236 and the negative-going waveforms 238 have been reduced to about one third of the maximum duty cycle (100%). The graph 240 illustrates trailing-edge modulation of the duty cycle of the driving waveform, i.e., the leading edge of the voltage pulse of both polarities occurs near the zero-crossing of the current waveform for all values of the duty cycle. Also, graph 240 shows the case of the voltage provided by the power supply not delivering the maximum power capacity of the H-bridge circuit such as when the lamp is dimmed or the power supply voltage is higher than the design minimum value. In contrast, the graph 210 shows the case of the maximum amount of delivered power matching the maximum capacity of the tank circuit.

Figure 7D:
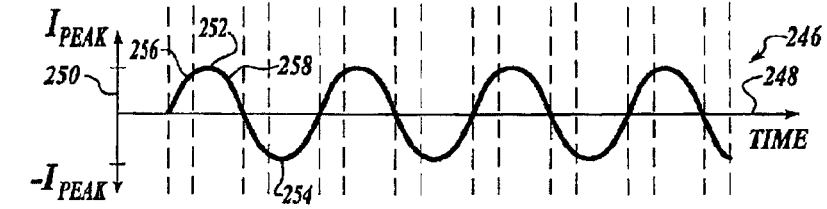

In a fourth row graph 246 of FIG. 7D, a horizontal time axis 248 and a vertical current axis 250 are displayed that correspond to the voltage waveform illustrated in the graph 240. The maximum value of a positive current waveform 252 is equal to the positive peak current value. Similarly, the maximum value of a negative current waveform 254 is equal to the negative peak current value. A rounded rising edge 256 occurs at the resonant frequency of the tank circuit 108 when the positive current waveform 252 is charging up the circuit and when the circuit initially begins to discharge current to the load. Similarly, a rounded falling edge 258 occurs when the tank circuit 108 starts to discharge less current to the load. It is important to note that the tank circuit provides for smoothing the current waveform provided to the load when the voltage waveform is operating at less than a 100% duty cycle. The voltage waveform pulses shown in graph 240 pulse at the zero crossing point of the current waveform illustrated in the graph 246 so that the amount of energy delivered to the tank is controlled.

Figure 7E:
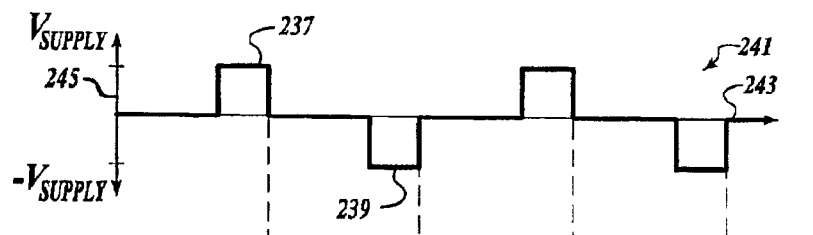
FIGS. 7E–7F illustrates two graphs for leading edge modulation of the voltage waveform and the corresponding current waveform at partial power.
Figure 7F:
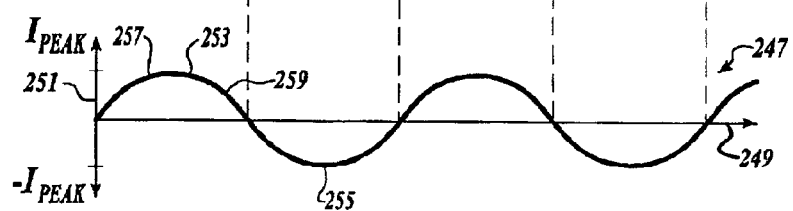

FIGS. 7E and 7F are two graphs that illustrate the correspondence between a leading edge modulation of the AC voltage signal generated by the present invention and the current supplied to the load, under reduced power conditions. The leading edge modulation of the AC voltage signal may be used in substantially the same manner as indicated in FIGS. 7A–tD for the trailing edge AC voltage signal. For leading edge modulation, the AC voltage signal is turned on sometime after the zero crossing point of the AC current waveform has occurred and turns off at its next zero crossing point.

In a top row graph 241 of FIG. 7E, a horizontal time axis 247 and a vertical voltage axis 245 are shown. The peak voltage amplitude delivered to the load by the voltage waveforms 237 and 239 are equal to the supply voltage and the peak-to-peak load voltage is twice the supply voltage. In graph 241, the duty cycles of both the positive-going waveforms 237 and the negative-going waveforms 239 have been reduced to about one third of the maximum duty cycle (100%). Also, graph 241 shows the case of the voltage provided by the power supply not delivering the maximum power capacity of the H-bridge circuit such as when the lamp is dimmed or the power supply voltage is higher than the design minimum value.

In a bottom row graph 247 of FIG. 7F, a horizontal time axis 249 and a vertical current axis 251 are displayed that correspond to the voltage waveform illustrated in the graph 241. The maximum value of a positive current waveform 253 is equal to the positive peak current value. Similarly, the maximum value of a negative current waveform 255 is equal to the negative peak current value. A rounded rising edge 257 occurs at the resonant frequency of the tank circuit 108 when the positive current waveform 253 is charging up the circuit and when the circuit initially begins to discharge current to the load. Similarly, a rounded falling edge 259 occurs when the tank circuit 108 starts to discharge less current to the load. The voltage waveform pulses shown in graph 241 pulse before the zero crossing point of the current waveform illustrated in the graph 247 so that the amount of energy delivered to the tank is controlled.

Figure 8A:
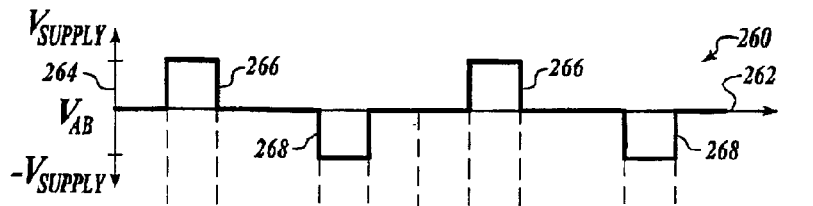
FIGS. 8A and 8B shows two graphs for double sided modulation of the voltage waveform and the corresponding current waveform at partial power.
Figure 8B:
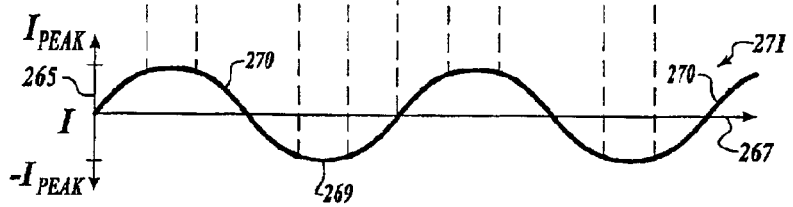

In FIG. 8A, a graph 260 illustrates the double-sided phase modulation of the AC voltage signal. A vertical voltage (Vab) axis 264 and a horizontal time axis 262 are displayed that correspond to the voltage waveform illustrated in graph 260. In the H-bridge, the peak voltage positive and negative waveforms 266 and 268 are equal to the supply voltage and the peak-to-peak voltage is twice the supply voltage. In a second graph 271 of FIG. 8B, a horizonal time axis 267 and a vertical current axis 265 are displayed which correspond to the voltage waveform illustrated in graph 260. The maximum value of a positive current waveform 270 is equal to the positive peak current value. Similarly, the maximum value of a negative current waveform 269 is equal to the negative peak current value. Additionally, since double-sided phase modulation centers the voltage waveform at the peak of the corresponding current waveform, the present invention provides for either increasing or decreasing the width (both sides) of the voltage waveform in relation to the amount of power delivered to the load.

In FIGS. 9A–9D, four graphs illustrate pulse train phase modulation of the AC voltage signal and the current supplied to the load under maximum power conditions. In a top row graph 278 of FIG. 9A, a horizontal time axis 272 and a vertical voltage axis 274 are shown. A positive voltage square-shaped waveform 276 is equal to the voltage provided by the voltage supply. Also, the waveform is on for the first half of the power cycle and off for the second half of the cycle.

Figure 9A:
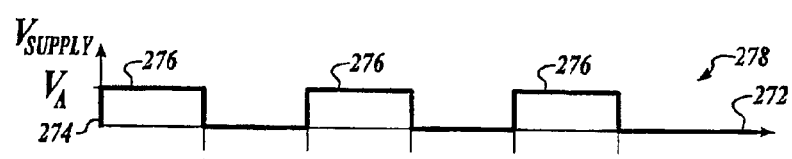
FIGS. 9A–9D illustrates four graphs for pulse train phase modulation of the voltage waveform and the current waveform at full power.
Figure 9B:
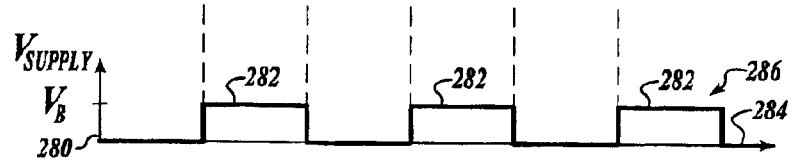

In a second row graph 286 of FIG. 9B, a horizontal time axis 284 and a vertical voltage axis 280 are shown. A positive voltage square-shaped waveform 282 is equal to the voltage provided by the voltage supply. Also, the waveform is off for the first half of the power cycle and on for the second half of the cycle.

Figure 9C:
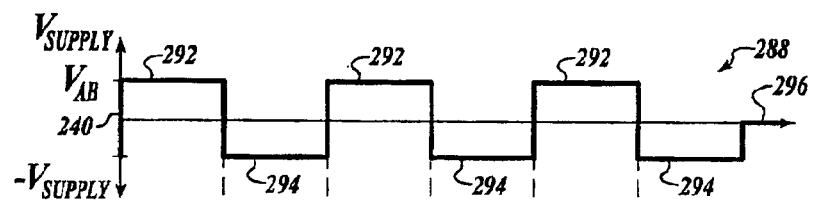
Figure 9D:
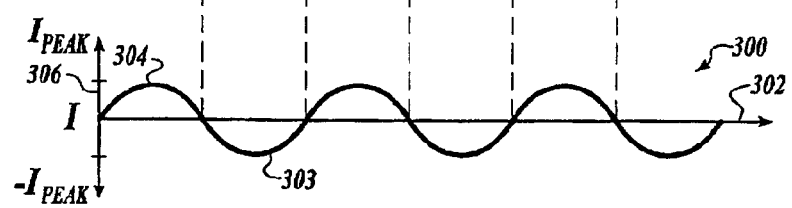
Figure 9E:
FIGS. 9E–9H displays four graphs for pulse train phase modulation of the voltage waveform and the current waveform at partial power.

In a third row graph 288 of FIG. 9C, a horizontal time axis 296 and a vertical voltage axis 290 are shown. A positive voltage square-shaped waveform 292 is equal to the voltage provided by the voltage supply and a negative voltage square-shaped waveform 294 is equal to the voltage provided by the supply. Also, the voltage waveforms alternate being on during the power cycle, i.e., the positive waveform is on for the first half of the cycle and the negative waveform is on for the second half In a fourth row graph 300 of FIG. 9D, a horizontal time axis 302 and a vertical current axis 306 are displayed that correspond to the voltage waveform illustrated in the graph 288. The maximum value of the positive current waveform 304 is equal to a positive peak current value. Similarly, the maximum value of the negative current waveform 303 is equal to a negative peak current value.

In FIGS. 9E–9H, four graphs illustrate pulse train phase modulation of the AC voltage signal and the current supplied to the load under reduced power conditions. In a top row graph 308 of FIG. 9E, a horizontal time axis 310 and a vertical voltage axis 312 are shown. A positive voltage square-shaped waveform 314 is equal to the voltage provided by the voltage supply. Also, the positive waveform 314 has a 50 percent duty cycle, i.e., the waveform is on for the first and second quarters (first half) of the power cycle and off for the third and fourth quarters (second half) of the cycle.

Figure 9F:
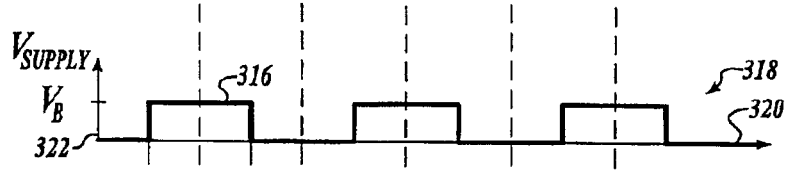

In a second row graph 318 of FIG. 9F, a horizontal time axis 320 and a vertical voltage axis 322 are shown. A positive voltage square-shaped waveform 316 is equal to the voltage provided by the voltage supply. Also, the positive voltage waveform has a 50 percent duty cycle, i.e., the waveform is on for the second and third quarters of the power cycle and off for the first and fourth quarters of the cycle.

Figure 9G:
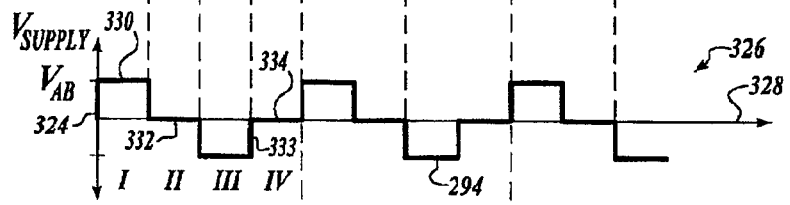

In a third row graph 326 of FIG. 9G, a horizontal time axis 328 and a vertical voltage axis 324 are shown. A positive voltage square-shaped waveform 330 is equal to the voltage provided by the voltage supply and a negative voltage square-shaped waveform 333 is equal to the voltage provided by the supply. The positive voltage waveform 330 is only on for the first quarter of the power cycle and the negative waveform 333 is only on for the third quarter of the cycle. During the second and fourth quarters of the power cycle, the net voltage across the load is zero because the voltage at the two outputs of the H bridge are equal and therefore cancel each other out.

Figure 9H:
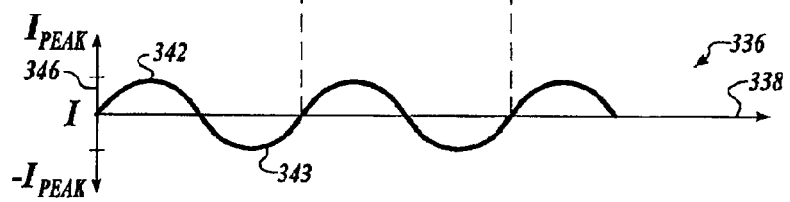

In a fourth row graph 336 of FIG. 9H, a horizontal time axis 338 and a vertical current axis 340 are displayed that correspond to the voltage waveform illustrated in the graph 326. The maximum value of the positive current waveform 342 is equal to a positive peak current value. Similarly, the maximum value of the negative current waveform 343 is equal to a negative peak current value. Also, the current waveform is shown delivering a reduced amount of power to the load. Additionally, it is envisioned that the relative phase of the voltage waveforms shown in graphs 308 and 318 could be varied to further modulate the amount of power delivered to the load.

Figure 10:
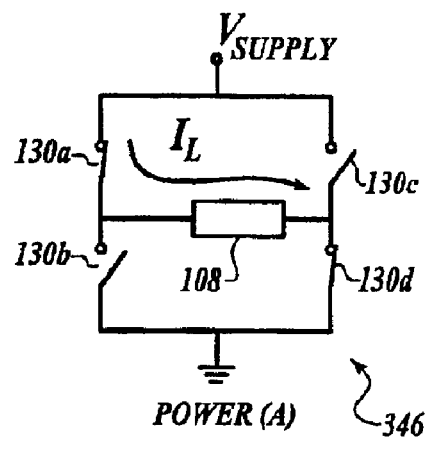
FIG. 10 shows the four states of the power switches and the direction of the load current during phase modulation.
Figure 10:
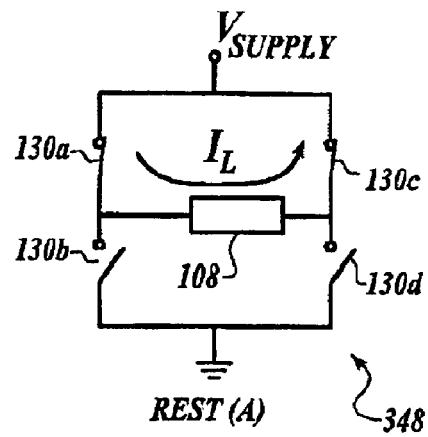
Figure 10:
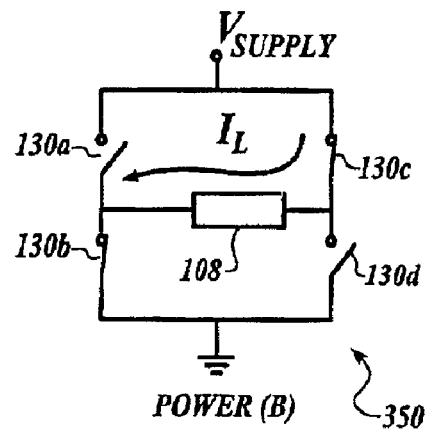
Figure 10:
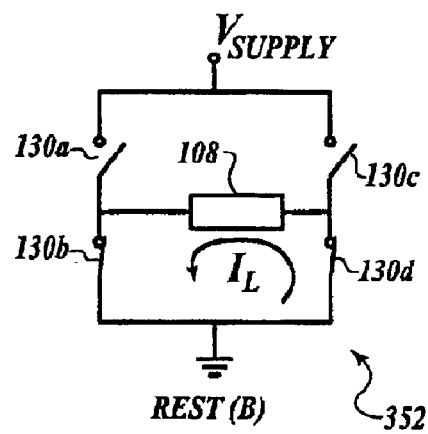

Looking now to FIG. 10, a schematic overview 344 shows the present invention configured in four operational modes that complete a cycle for driving a load with a phase modulated AC signal. All four phases, i.e., a power phase "I" 346, a rest phase "II" 348, a power phase "III" 350, and a rest phase "IV" 352, employ the same components. The power MOSFETs 130a, 130b, 130c and 130d are illustrated as discrete switches. When a power MOSFET is on (conducting), it is represented as a closed switch. Also, when the power MOSFET is off (non-conducting), it is represented as an open switch. In this way, the state of conduction for the power MOSFETs may be more clearly illustrated for the different phases of the cycle. The physical configuration of the MOSFETs is substantially similar to the configuration as presented in the discussion of FIG. 10 above.

As illustrated in power phase "I" 346, diagonally opposite power transistors 130b and 130c are off (open position) and power transistors 130a and 130d are on (closed position). A current from the Vsupply terminal flows through the power transistor 130a, passes through the tank circuit 108 and returns to earth ground through power transistor 130d.

When the flow of current from the Vsupply terminal is at least equal to a predetermined peak value as indicated by the peak current comparator 138 or the on-time timer 142 has finished, the power transistors will switch from power phase "I" 346 to the configuration identified as rest phase "II" 348. However, if neither of these conditions has occurred and the tank current has returned to the zero crossing point as indicated by the zero crossing detector 140, the power transistors will bypass the rest phase "A" and switch directly to the configuration identified as a power phase "III" 350. Typically, the bypassing of a rest phase will occur when there is a high load and a relatively low Vsupply voltage.

Rest phase "II" 348 is shown with the top laterally opposite power transistors 130a and 130c disposed in the closed position (on) and the bottom laterally opposite power transistors 130b and 130d configured in the open position (off). In the rest phase "II" 348 configuration, the tank circuit 108 discharges stored energy into the load by circulating a current through power transistors 130a and 130c. After the tank circuit has discharged at least a portion of its stored energy, the power transistors switch to the configuration identified as the power phase "III" 350.

Similarly, the power phase "III" 350 illustrates diagonally opposite power transistors 130a and 130d disposed in an open position and power transistors 130b and 130c in a closed position. A current from the Vsupply terminal flows through the power transistor 130c, passes through the tank circuit 108 and returns to ground through power transistor 130b. When the flow of current from the Vsupply terminal is at least equal to a predetermined peak current value indicated by the peak current comparator 138 or the on-time timer 142 has timed out, the power transistors switch from the power phase "III" 350 to the configuration identified as the rest phase "IV" 352.

Rest phase "IV" 352 is shown with top laterally opposite power transistors 130a and 130c disposed in the open position and the power transistors 130b and 130d configured in the closed position. In the rest phase "B" 208, the tank circuit 108 will discharge stored energy, i.e., a current, through power transistor 130b to ground. After discharging the stored energy for a period of time, the power transistors will return to the power phase "I" 346 configuration and the cycle of phases will repeat. In this way, power is transferred to the load continuously throughout the cycle (both power and rest phases) and the stored energy in the tank circuit 108 is replenished during each power phase.

In burst mode dimming, the discharge lamp 106 is switched on and off at an invisibly fast rate such as 180 Hertz. When the discharge lamp 106 is on, the frequency of the AC signal driving the lamp is determined by the on-time timer 142 and the zero crossing detector 140. A typical operating frequency would be 50 kilohertz. For a 50% burst mode dimming, the discharge lamp 106 would be turned off half of the time. In practice for the representative frequencies chosen this would mean that an on time would last 2.7 milliseconds and would comprise 135 cycles of 50 khz oscillation. This on time would be followed by 2.7 milliseconds of off time. Similarly, a 5% burst mode dimming would have an on time of 0.27 milliseconds comprising about 13 cycles of 50 Khz lamp current followed by approximately 5.3 milliseconds of off time. The sum of the on and off periods would equal 180 hertz. When burst mode dimming is asserted (the discharge lamp is off), analog feedback in the IC 104 is considered invalid. In this way, the loop compensation capacitor 148 is neither charged nor discharged and the correct on-time setting for the on-time timer 142 is "remembered" between burst mode off states.

Figure 11:
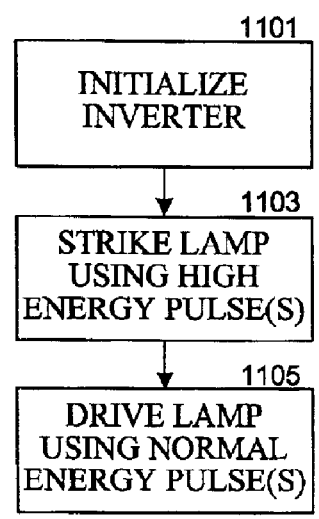
FIG. 11 is a flow diagram illustrating the method of the present invention.

The foregoing provides a detailed description of one particular embodiment of the present invention. However, in the more general sense, the method of the present invention is shown in FIG. 11. First, at step 1101, the inverter 100 is initialized. This may, for example, include various procedures such as powering up various components. Next, at step 1103, the inverter 100 provides one or more high energy pulses in order to strike the lamp (or other load). The term "high energy pulses" as used herein refers to a pulse of energy that is higher than that of the energy pulses during normal operation. In the pulse width modulation described above, this corresponds to a wider pulse width. Finally, at step 1105, after the lamp has been struck, the high energy pulses are discontinued and normal energy pulses are provided.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. Apparatus for driving a cold cathode fluorescent lamp (CCFL), comprising:
    (a) a network of a plurality of switches for generating an AC signal from a DC signal coupled to the network of the plurality of switches, the AC signal being generated by a portion of the network of the plurality of switches periodically opening and closing opposite to the periodic opening and closing of another portion of the network of the plurality of switches;
    (b) means for filtering being coupled between the network of the plurality of switches and the lamp, the means for filtering acting to filter the AC signal delivered to the lamp; and
    (c) a controller for periodically opening and closing portions of the network of the plurality of switches based on a resonant frequency of the means for filtering, so that the optimal amount of electrical power is provided for driving the lamp under a range of voltages provided by the DC signal, said controller also operative to provide a higher energy pulse during striking of the lamp, wherein the plurality of switches are MOSFET's arranged in an H-bridge network.

2. The apparatus of claim 1, further comprising a gate driver for each MOSFET in the H-bridge network, each gate driver providing amplification of logic signals that control the operation of the associated MOSFET.

3. The apparatus of claim 2, further comprising a capacitor having an end coupled to an output terminal of the H-bridge network and the load and another end connected to a diode that is coupled to a voltage reference, the capacitor enabling a turn on voltage to be applied to a gate of an upper MOSFET when the voltage at a source of the upper MOSFET is approximately equal to a rail of a power supply.

4. The apparatus of claim 3, wherein the gate driver provides for initially charging the capacitor before the load is driven by the AC signal.

5. The apparatus of claim 3, wherein the gate driver provides for charging the capacitor when the MOSFET associated with gate driver is not conducting.

6. The apparatus of claim 1, wherein the controller periodically opens and closes portions of the network of the plurality of switches based on a duty cycle to phase modulate the AC signal, said controller operative to provide a wider pulse width during the striking of the lamp.

* * * * *

UNITED STATES PATENT AND TRADEMARK OFFICE
CERTIFICATE OF CORRECTION

PATENT NO. : 6,900,600 B2
DATED : May 31, 2005
INVENTOR(S) : Timothy James Rust et al.

It is certified that error appears in the above-identified patent and that said Letters Patent is hereby corrected as shown below:

<u>Column 18,</u>
Line 13, insert period after "half".

Signed and Sealed this

Eleventh Day of October, 2005

JON W. DUDAS
*Director of the United States Patent and Trademark Office*